United States Patent [19]

Tzeng et al.

[11] Patent Number: 4,907,014

[45] Date of Patent: Mar. 6, 1990

[54] SAFELY RETRACTING PAPER-CUTTING APPARATUS FOR A ROLL PAPER PRINTER

[75] Inventors: Paul S. Tzeng, Fountain Valley; Richard Mansueto, Huntington Beach, both of Calif.

[73] Assignee: Calcomp Inc., Anaheim, Calif.

[21] Appl. No.: 353,862

[22] Filed: May 18, 1989

[51] Int. Cl.[4] .......................... G01D 9/00; B26D 5/08

[52] U.S. Cl. ...................................... 346/24; 346/136; 83/564; 83/614; 358/304; 400/621

[58] Field of Search .................. 346/24, 136; 358/304; 83/564, 614; 400/621

[56] References Cited

U.S. PATENT DOCUMENTS

| | | | |
|---|---|---|---|
| 4,152,962 | 5/1979 | Hendrischic | 83/482 |
| 4,504,162 | 3/1985 | Speraggi | 400/621 |

*Primary Examiner*—Bruce A. Reynolds

*Assistant Examiner*—Gerald E. Preston

*Attorney, Agent, or Firm*—Donald A. Streck; Wm. F. Porter, Jr.

[57] ABSTRACT

An apparatus which records an image, such as text, onto printable media, such as paper, has a removably closable lid, a paper cutting blade mounted on an pivoting arm having an equilibrium position in which the blade is withdrawn in a safe position, and a rod actuator cooperative with the lid for rotating the pivoting arm whenever the lid is closed so as to move the blade from the safe position to an operative position adjacent a cutting block suitable for severing the media. The pivoting arm is rotatable about a pivot pin, the blade being attached at one end of the arm and the other end of the arm being lighter, so that the blade tends to fall toward the safe position under a front cover of the apparatus whenever the lid is opened.

24 Claims, 2 Drawing Sheets

SAFELY RETRACTING PAPER-CUTTING APPARATUS FOR A ROLL PAPER PRINTER

BACKGROUND OF THE INVENTION:

This invention is related to printers, thermal printers, facsimile machines, and the like, which employ a roll of paper for recording information and, more particularly, to safety printing apparatus for printing onto a roll-fed media and for severing the media into image-bearing portions comprising, a roll of the media disposed between a supply point and an outlet point; printing means disposed between the supply point and the outlet point for printing images on the media; a removably closable lid; a cutting blade disposed under the lid between the printing means and the outlet point; pivoting means for supporting the cutting blade and for permitting the cutting blade to fall to a withdrawn safety position from the force of gravity; and means on the lid for moving the pivoting means and the cutting blade therewith whenever the lid is closed away from the safety position to an operating position.

Various types of roll-fed paper-recording devices, including printers, plotters, thermal printers, and facsimile machines, store a large roll of paper which is fed under a printing head or station of some type. In order to print a standard 8.5" by 11" document page, for example, an 11 inch section of the roll must be severed by a paper cutter which, in the better devices, is internal to the device. The cutter should be located between the printer head and the paper exit of the device, and must be sharp. Furthermore, the device should have an openable cover which exposes the paper path in the vicinity of the cutter, permitting the operator to replenish the paper roll and thread the leader of the new roll through the pinch rollers, paper guides, and cutter. As a result, it is difficult to design a practical printer, or the like, in which the operator does not bear some risk in contacting the sharp paper cutter whenever the paper roll must replenished.

Various techniques are known for housing or moving a paper cutter in a printer. For example, U.S. Pat. No. 1,643,583 described a paper cutter for a typewriter in which the rotary cutter head and its protective housing are rotatable about an axis away from the paper upon completion of each paper cutting operation. U.S. Pat. No. 3,925,786 describes a plotter having a paper cutter in which a cutting head on a cylinder inside a stationary housing rotates away from the paper by rotation of the cylinder upon completion of each paper cutting operation. U.S. Pat. No. 4,042,939 discloses a printer in which part of a paper cutter assembly is attached to the cover lid of the printer, the assembly including a cutter blade which is retracted from the paper by a solenoid upon completion of each paper cutting operation. U.S. Pat. No. 4,701,063 describes a printer with a rotary cutter blade which is supported by a fulcrum rotated by a spring actuator upon the completion of each paper cutting operation.

These prior patents fail to adequately address the problem of protecting the operator from the paper cutting blade while he accesses the paper path near the paper cutter during replenishment of the paper roll, for example. None of them discloses automatically taking special action at the time the operator gains access to the paper path through the printer, or upon opening the cover lid of the printer. Moreover, in each of these prior patents movement or retracting of the cutter is for the purpose of permitting printing or recording operations between cutting operations and was performed by powered actuators or similar devices. Accordingly, the retracting mechanism add significantly to the cost of the device. Where cost is a factor, therefore, they are simply omitted in the interest of economy.

Wherefore, it is an object of the invention to increase the safety with which printers, plotters, thermal printers, facsimile machines and the like may be operated, particularly during paper roll replenishment.

It is a further object of the invention to provide a safe printer or the like in which the paper cutting head automatically retracts to a protected position under the housing lip whenever the top cover is opened by the operator.

It is yet a further object of the invention to provide a means for automatically retracting the paper cutting head in a printer or the like below the housing lip whenever the top cover is opened without requiring any powered actuators.

It is an even further object of the invention to provide an automatic paper cutter head retracting device in a printer or the like which simply relies on gravity to retract the paper cutting head to a safe position with respect to the operator whenever he opens the top cover of the printer.

It is yet another object of the invention to provide an automatic paper cutter head retracting device in a printer or the like which retracts the paper cutting head to a safe position with respect to the operator and which is simple and inexpensive to include within the apparatus and not be omitted for cost savings sake.

Other objects and benefits of the invention will become apparent from the description which follows hereinafter when taken in conjunction with the drawing figures which accompany it.

SUMMARY

These and other objects and advantages are realized in a device which records an image onto a roll-fed media by the safety cutting apparatus of the present invention for severing the media into lengths containing individual image portions comprising, a removably closable lid carried by the device; media cutting means mounted on a pivoting arm carried by the device, the media cutting means being pivotable between a safety position in which the cutting means are withdrawn to a safe position within the device and a working position in which the cutting means are in interacting contact with a cutting member carried by the device past which the media is moved, the media cutting means being biased towards the safety position and being movable across the cutting member to sever the media when in the working position; rod actuator means cooperative with the lid for rotating the pivoting arm from the safe position to the working position whenever the lid is closed; and cutting actuation means for moving the media cutting means across the cutting member to sever the media.

In the preferred embodiment, the pivoting arm is rotatable about a pivot pin carried by the device and parallel to the cutting member, the cutting means being attached at one end of the arm and the other end of the arm being lighter with respect thereto so that the one end of the arm tends to fall below the level of the other end of the arm toward the safety position under the influence of gravity as a biasing force. Additionally, the rod actuator means comprises a flange attached to and extending from the cover means toward the pivoting arm.

Also in the preferred embodiment, there are cover means carried by the device for covering a portion of the apparatus and having a lip defining an opening in the cover means through which the media is transported and face means on the lid and movable with the lid to a position adjacent the cover means whenever the lid is closed for blocking access to the cutting means while the cutting means is in the working position, the safety position of the cutting means being a location which is recessed with respect to the cover means. Additionally, there is a media cutting block adjacent the lip of the cover means, the media being transported over the cutting block on its way toward the opening in the cover means, the cutting means being adjacent the cutting block whenever the cutting means is in the working position. The preferred embodiment also includes drive means for moving the cutting means in a direction transverse to the direction in which the media is transported in the device while the cutting means is in the working position so as to press the media against a cutting edge of the cutting block and sever the media along the cutting edge. The preferred drive means moves the cutting means between positions on opposite sides of edges of the media wherein the cutting means no longer contacts the media whenever the media is transported in the apparatus.

Further in the preferred embodiment, the cutting means comprises a rotary blade rotatable about the pivoting arm; the flange includes a surface facing the arm and extending in a transverse direction; and the drive means moves the pivoting arm transversely across the media while the rotary blade rotates against the cutting edge of the cutting block and while the arm rolls on the flange surface.

Figure 1:
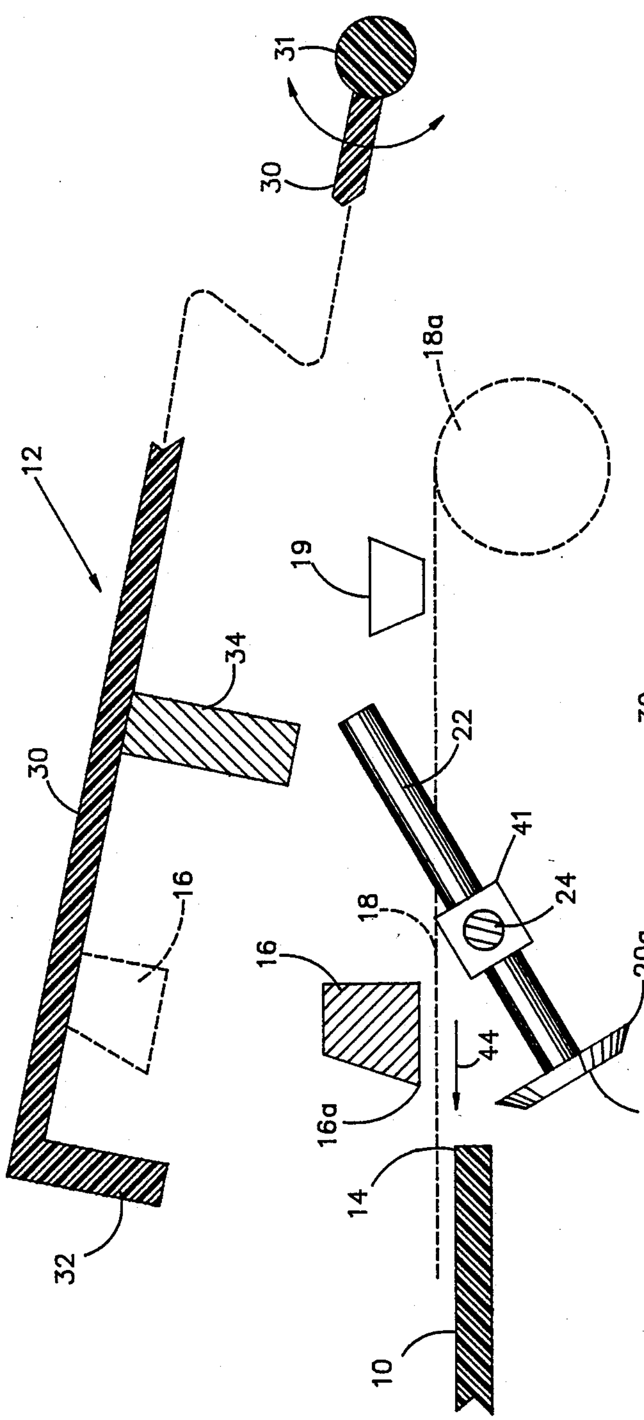
FIG. 1 is a sectional view of a portion of one side of a printer embodying the invention in which the printer's top cover is opened.

DESCRIPTION OF THE PREFERRED EMBODIMENT:

Referring to FIG. 1, a front cover 10 of a printer 12 has an edge or lip 14 facing a paper cutting block 16. Paper 18 (dashed line) is fed from a roll of paper *18a* under the cutting block 16 and over the front cover 10. The printer 12 has a printing head 19 between the paper roll *18a* and the cutting block 16 which imprints an image or information onto the paper 18 prior to the cutting block 16. A circular paper cutting blade 20 is mounted for rotation on an axle 22. The axle 22, in turn, is mounted to pivot about a pivot pin 24. The blade 20 is sufficiently heavy to cause the axle 22 to hang from the pivot pin 24 so that the blade end hangs below the pivot pin 24 and below the front cover lip 14 under the influence of gravity. The sharp edge *20a* of the blade 20 is therefore out of the way and shielded by the lip 14 from causing injury to an operator. A top cover 30 on the printer 12 rotates upwardly about a hinge point 31 to expose the paper path, thus permitting an operator to change the paper 18 or check the paper path. The top cover 30 includes a front face 32 and a rod actuator 34 extending perpendicularly with respect to the bottom surface of the front cover 30. Preferably, the rod actuator 34 is a flange extending across the entire width of the paper 18.

Figure 2:
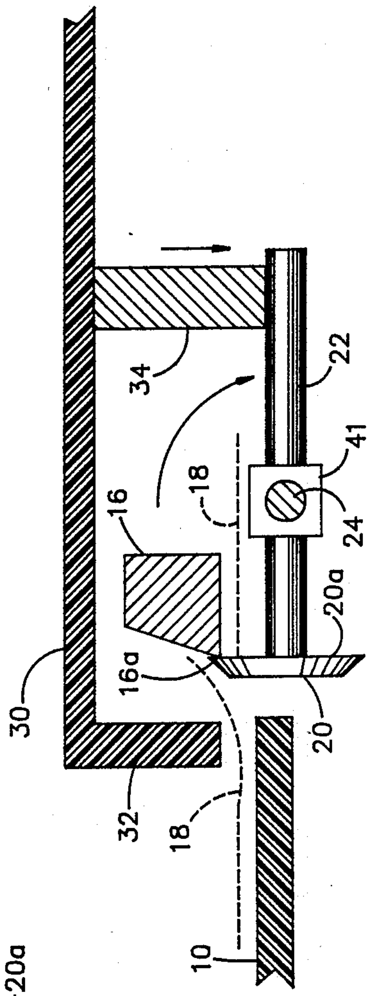
FIG. 2 corresponds to the view of FIG. 1 with the top cover closed and the cutter blade axle rotated to force the cutter blade against the cutting block surface.

Referring to FIG. 2, the top cover 30 closes over the printer 12 by rotating downwardly about the hinge point 31 until its front face 32 nearly touches the top surface of the front cover 10 (allowing space for the paper 18 to pass through). The front face 32 thus prevents contact by the operator with the blade 20. During this downward rotation, and under guidance of the top cover hinge point 31, the rod actuator 34 engages the free end of the axle 22, forcing it down and thus forcing the axle 22 to rotate so as the bring the blade 20 up toward the cutting block 16. FIG. 2 illustrates the position of the cutter blade 20 and the axle 22 after the top cover 30 is completely closed. In this position, the sharp edge *20a* of the blade 20 faces up while the edge 16a of the cutting block is adjacent the face of the blade 20 so as to be poised to sever the paper 18, as indicated in dashed line in FIG. 2.

Figure 3:
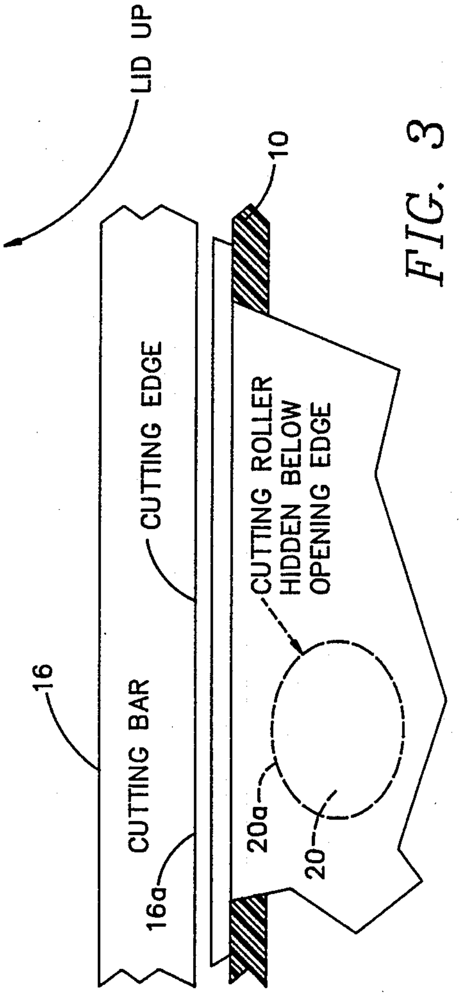
FIG. 3 is a front view of the printer corresponding to FIG. 1.

The front view of FIG. 3 illustrates how the printer 12 appears to an operator who opens the top cover 30 while facing the front cover 10. The circular cutting blade 20 (dashed lines) is hidden below the opening edge or lip 14 of the front cover 10 so that the operator is not likely to touch the sharp blade edge *20a*.

Figure 4:
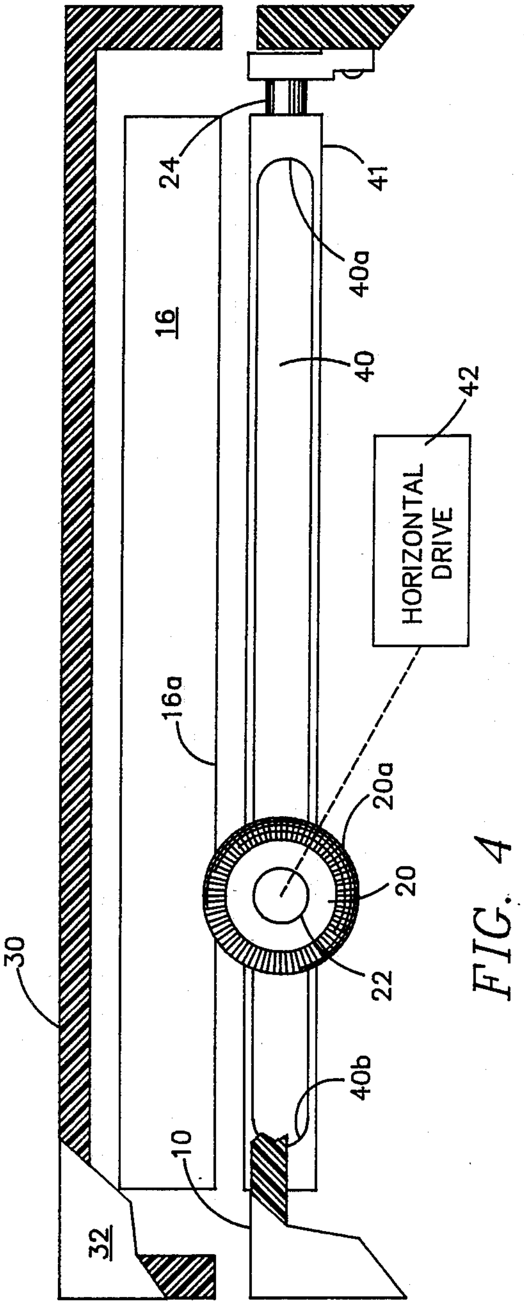
FIG. 4 is a front view of the printer corresponding to FIG. 2.

The cut-away front view of FIG. 4 illustrates the printer 12 when the top cover 30 is fully closed. In this view, a horizontal track 40 in a track housing 41 is seen in which the axle 22 of the circular blade 20 is guided and is horizontally movable from left to right by a horizontal blade drive 42. During printing operations, while the paper 18 is transported in the direction indicated by the arrow 44 of FIG. 1, the axle 22 resides at one end *40a* of the horizontal track so that the blade 20 does not interfere with the paper 18. Whenever an image-bearing portion of the paper 18 has cleared the cutter block 16 and is to be cut off the roll, the cutting blade 20 is activated to sever the desired portion. To accomplish the cutting action, the blade drive 42 moves the blade axle 22 across the width of the paper 18 by transporting the axle 22 from the one end *40a* of the horizontal track to the other end 40b so that it rolls along the length of the rod actuator or flange 34. This squeezes the paper 18 between the face of the blade 20 and the cutting block edge *16a* so that the paper 18 is pressed onto the sharp blade edge *20a* and is severed.

In the embodiment described herein, the blade 20 always retracts below the front cover 10 whenever the top cover 30 is opened without the use of any actuating devices, simply by employing gravity. In this embodiment, the only actuation employed is in the reverse direction when the cover 30 is closed and the blade 20 rotated into its active position. However, in an alternative embodiment, mechanical actuation may also be employed to move the blade 20 from its active position (of FIG. 2) to its safety retracted position (of FIG. 1).

In another possible variation, the cutting block 16 may be attached to the top cover 30 to go up and down with it as depicted in ghosted form in FIG. 1. This results in removing all the cutting apparatus from an operator's path when loading paper into the printer/-plotter. Another aspect of this approach is that there is no "slot" that the paper 18 must be fed through (e.g. between the bottom of the cutting block 16 and top of front cover 10 in FIG. 1) when being loaded as the cutting block 16 is raised and the blade 20 is lowered and/or moved to a safety position to one side of the path of the paper 18.

While the invention has been described in detail by specific reference to preferred embodiments thereof, it is understood that variations and modifications thereof may be made without departing from the true spirit and scope of the invention.

Wherefore, having thus described the invention, what is claimed is:

1. In a device which records an image onto a roll-fed media, safety cutting apparatus for severing the media into lengths containing individual image portions comprising:

(a) a removably closable lid carried by the device;

(b) media cutting means mounted on a pivoting arm carried by the device, said media cutting means being pivotable between a safety position in which said cutting means are withdrawn to a safe position within the device and a working position in which said cutting means are in interacting contact with a cutting member carried by the device past which the media is moved, said media cutting means being biased towards said safety position and being movable across said cutting member to sever the media when in said working position;

(c) rod actuator means cooperative with said lid for rotating said pivoting arm from said safe position to said working position whenever said lid is closed; and (d) cutting actuation means for moving said media cutting means across said cutting member to sever the media.

2. The apparatus of claim 1 wherein:

said pivoting arm is rotatable about a pivot pin carried by the device and parallel to said cutting member, said cutting means being attached at one end of said arm and the other end of said arm being lighter with respect thereto so that said one end of said arm tends to fall below the level of said other end of said arm toward said safety position under the influence of gravity as a biasing force.

3. The apparatus of claim 1 wherein:

said rod actuator means comprises a flange attached to and extending from said cover means toward said pivoting arm.

4. The apparatus of claim 1 and further comprising:

(a) cover means carried by the device for covering a portion of said apparatus and having a lip defining an opening in said cover means through which said media is transported; and (b) face means on said lid and movable with said lid to a position adjacent said cover means whenever said lid is closed for blocking access to said cutting means while said cutting means is in said working position, said safety position of said cutting means being a location which is recessed with respect to said cover means.

5. The apparatus of claim 4 and further comprising:

a media cutting block adjacent said lip of said cover means, said media being transported over said cutting block on its way toward said opening in said cover means, said cutting means being adjacent said cutting block whenever said cutting means is in said working position.

6. The apparatus of claim 5 further comprising:

drive means for moving said cutting means in a direction transverse to the direction in which the media is transported in the device while said cutting means is in said working position so as to press the media against a cutting edge of said cutting block and sever said media along said cutting edge.

7. The apparatus of claim 6 wherein:

said drive means moves said cutting means between positions on opposite sides of edges of the media wherein said cutting means no longer contacts the media whenever the media is transported in said apparatus.

8. The apparatus of claim 7 wherein:

(a) said cutting means comprises a rotary blade rotatable about said pivoting arm;

(b) said flange includes a surface facing said arm and extending in a transverse direction; and (c) said drive means moves said pivoting arm transversely across the media while said rotary blade rotates against said cutting edge of said cutting block and while said arm rolls on said flange surface.

9. The apparatus of claim 5 wherein:

said media cutting block is carried by said lid to be raised in combination therewith and to be lowered to a position adjacent said lip of said cover means when said lid is closed.

10. Safety printing apparatus for printing onto a roll-fed media and for severing the media into image-bearing portions comprising:

(a) a roll of the media disposed between a supply point and an outlet point;

(b) printing means disposed between said supply point and said outlet point for printing images on the media;

(c) a removably closable lid;

(d) a cutting blade disposed under said lid between said printing means and said outlet point;

(e) pivoting means for supporting said cutting blade and for permitting said cutting blade to fall to a withdrawn safety position from the force of gravity; and (f) means on said lid for moving said pivoting means and said cutting blade therewith whenever said lid is closed away from said safety position to an operating position.

11. The apparatus of claim 10 wherein:

(a) said pivoting means is rotatable about a pivot pin; and (b) said cutting blade is attached at one end of said pivoting means with the other end of said pivoting means being lighter with respect to said one end so that said one end tends to fall below the level of said other end toward said safety position.

12. The apparatus of claim 10 wherein:

said means for moving comprises a flange carried by and extending from said lid toward said pivoting means.

13. The apparatus of claim 10 and further comprising:

(a) cover means for covering a portion of said apparatus and having a lip defining an opening in said cover means through which printable media is transportable; and (b) face means on said lid movable with said lid to a position adjacent said cover means whenever said lid is closed for blocking access to said blade, said safety position being a location which is recessed with respect to said cover means.

14. The apparatus of claim 13 and further comprising:

a cutting block adjacent said lip of said cover means, the media being transported adjacent said cutting block on its way toward said opening in said cover means, said blade adjacent said cutting block in said operating position.

15. The apparatus of claim 14 and further comprising:

drive means for moving said blade in a direction transverse to the direction in which the media is transported in said apparatus so as to press the media against said cutting block and sever the media.

16. The apparatus claim 15 wherein:

said drive means moves said blade between positions on opposite sides of the media wherein said cutting means no longer contacts said media whenever said media is transported in said apparatus while said cutting means is in said operative position.

17. The apparatus of claim 14 wherein:

said cutting block is carried by said lid to be raised in combination therewith and to be lowered to a position adjacent said lip of said cover means when said lid is closed.

18. Safety cutting apparatus for use in a printing device having a removably closable lid and a cover for covering a portion of the device and having a lip defining an opening in the cover through which printable media is transported, said cutting apparatus comprising:

(a) a cutting blade disposed under the lid and supported on one end of an arm which is pivotable about a fulcrum, the other end of said arm being lighter than said one end whereby said cutting blade tends to fall under the lip of the cover to a safety position from the force of gravity; and (b) means for pushing said other end of said arm down whenever said lid is closed whereby said cutting blade is pushed up from under the lip of the cover to a working position when said lid is closed.

19. The safety cutting apparatus of claim 18 wherein:

said means for pushing comprising a flange carried by and extending from said lid toward said other end of said arm.

20. The safety cutting apparatus of claim 18 and further comprising:

face means on said lid movable with said lid to a position adjacent said cover whenever said lid is closed so as to block access to said cutting blade, said one arm end tending to fall to a position below said face means.

21. The safety cutting apparatus of claim 20 and further comprising:

a cutting block adjacent said lip of said cover means, said media being transported adjacent said cutting block on its way toward said opening in said cover means, said blade being adjacent said cutting block in said operative position.

22. The safety cutting apparatus of claim 21 and further comprising:

drive means for moving said blade in a direction transverse to the direction in which the media is transported so as to press the media against said cutting block and sever the media.

23. The safety cutting apparatus of claim 21 wherein:

said cutting block is carried by said lid to be raised in combination therewith and to be lowered to a position adjacent said lip of said cover means when said lip is closed.

24. Safety cutting apparatus for use in a printing device having a removably closable lid and a cover for covering a portion of the device and having a lip defining an opening in the cover through which printable media is transported, said cutting apparatus requiring no slot through which a printable media must be fed and comprising:

(a) a cutting blade disposed under the lid and moveable to a storage position on one side of a central cutting area over which the printable media passes;

(b) a cutting block under which the printable media is transported between a supply roll thereof and said opening in said cover means, said cutting block being carried by said lid to be raised in combination therewith and to be lowered to an operative position adjacent said lip of said cover means when said lid is closed, said blade being adjacent said cutting block when said cutting block is in said operative position; and, (c) drive means for moving said blade in a direction transverse to the direction in which the printable media is transported when said cutting block is in said operative position so as to press the printable media against said cutting block and sever the printable media.

* * * * *